US012739885B2

(12) United States Patent
Taherzadeh Boroujeni et al.

(10) Patent No.: US 12,739,885 B2
(45) Date of Patent: Sep. 15, 2026

(54) TECHNIQUES FOR COMMUNICATING RANDOM ACCESS MESSAGES BASED ON BEAM REFINING IN WIRELESS COMMUNICATIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 88 days.

(21) Appl. No.: 17/179,290

(22) Filed: Feb. 18, 2021

(65) Prior Publication Data

US 2021/0266975 A1 Aug. 26, 2021

Related U.S. Application Data

(60) Provisional application No. 62/980,031, filed on Feb. 21, 2020.

(51) Int. Cl.

| | |
|---|---|
| ***H04W 74/0833*** | (2024.01) |
| ***H04B 7/06*** | (2006.01) |
| ***H04W 16/28*** | (2009.01) |
| ***H04W 72/1268*** | (2023.01) |
| ***H04W 74/0836*** | (2024.01) |

(52) U.S. Cl.

CPC .... *H04W 74/0833* (2013.01); *H04B 7/06958* (2023.05); *H04W 16/28* (2013.01); *H04W 72/1268* (2013.01); *H04W 74/0836* (2024.01)

(58) Field of Classification Search

None

See application file for complete search history.

(56) References Cited

U.S. PATENT DOCUMENTS

| | | | | |
|---|---|---|---|---|
| 10,813,097 | B2 | 10/2020 | Islam et al. | |
| 10,820,352 | B2 * | 10/2020 | Ishii | H04W 48/12 |
| 10,893,544 | B2 * | 1/2021 | Hakola | H04W 56/001 |
| 11,006,441 | B2 * | 5/2021 | Shih | H04L 5/0048 |

(Continued)

FOREIGN PATENT DOCUMENTS

WO 2018231655 A1 12/2018

OTHER PUBLICATIONS

U.S. Appl. No. 62/888,069, filed Aug. 16, 2019, Rastegardoost et al., "2-Step RACH Transmission and Repetition".*

(Continued)

*Primary Examiner* — Gregory B Sefcheck

(74) *Attorney, Agent, or Firm* — Arent Fox Schiff, LLP

(57) ABSTRACT

Aspects described herein relate to transmitting a first random access message in a random access procedure based on whether beam refinement is configured. In an aspect, it can be determined whether a base station uses beam refinement for receiving a first random access message in a two-step random access procedure. Based on whether the base station uses beam refinement, one or more parameters for transmitting the first random access message can be determined, and the first random access message can be transmitted to the base station and based on the one or more parameters.

14 Claims, 7 Drawing Sheets

(56) References Cited

U.S. PATENT DOCUMENTS 11,363,637 B2 * 6/2022 Zhang .................. H04W 72/30
2017/0367120 A1 * 12/2017 Murray ................. H04L 5/0023
2018/0027594 A1 1/2018 Nagaraja et al.
2018/0097541 A1 * 4/2018 Bhattad ................. H04L 5/0012
2018/0102826 A1 * 4/2018 Raghavan ............ H04B 7/0621
2018/0146419 A1 * 5/2018 Raghavan ............. H04W 48/16
2018/0206132 A1 * 7/2018 Guo ..................... H04B 7/0695
2019/0052334 A1 2/2019 Jeon et al.
2019/0069285 A1 * 2/2019 Chandrasekhar ..... H04W 72/23
2019/0132778 A1 * 5/2019 Park ..................... H04B 7/0695
2019/0207737 A1 * 7/2019 Babaei .................. H04W 76/11
2019/0215888 A1 * 7/2019 Cirik ................. H04W 72/0446
2019/0261234 A1 * 8/2019 Park .................. H04W 36/0069
2019/0306667 A1 * 10/2019 Kim ...................... H04W 88/10
2019/0306924 A1 * 10/2019 Zhang .................... H04B 7/063
2019/0313442 A1 * 10/2019 Hosseini ............... H04L 5/0091
2019/0334611 A1 * 10/2019 Zhang .................... H04B 7/086
2019/0341992 A1 * 11/2019 Zhou .................... H04B 17/104
2020/0007222 A1 * 1/2020 Ruder .................. H04B 7/0837
2020/0053792 A1 * 2/2020 Ryu .................. H04W 74/0833
2020/0260391 A1 * 8/2020 Zhou ..................... H04L 1/1819
2020/0267768 A1 * 8/2020 Hakola ................. H04L 5/0091
2020/0358505 A1 * 11/2020 Park ..................... H04B 7/0456
2021/0022127 A1 * 1/2021 Xu ........................ H04L 1/1812
2021/0037347 A1 * 2/2021 Kim ...................... H04W 76/27
2021/0051672 A1 * 2/2021 Rastegardoost .. H04W 74/0833
2021/0051707 A1 * 2/2021 Rastegardoost ...... H04L 5/0051
2021/0058971 A1 * 2/2021 MolavianJazi ...... H04B 17/318
2021/0136802 A1 * 5/2021 Cirik .................... H04B 7/0695
2021/0144720 A1 * 5/2021 Xu ........................ H04L 5/0051
2021/0175957 A1 * 6/2021 Raghavan ............. H04L 5/0023
2021/0184746 A1 * 6/2021 Park ...................... H04L 5/0051
2021/0234646 A1 * 7/2021 Koskela ................ H04W 72/56
2021/0258942 A1 * 8/2021 Bai ........................ H04L 5/0023
2021/0360429 A1 * 11/2021 Reial ....................... H04W 8/24
2022/0078858 A1 * 3/2022 Matsuda ............... H04W 72/23
2022/0131676 A1 * 4/2022 Zhang ..................... H04L 5/005
2023/0032007 A1 * 2/2023 Ali ....................... H04B 7/0695
2024/0072952 A1 * 2/2024 Rom ..................... H04L 5/0091
2025/0024506 A1 * 1/2025 Taherzadeh Boroujeni ................ H04W 74/0833

OTHER PUBLICATIONS

U.S. Appl. No. 62/967,488 dated Jan. 29, 2020, Ali et al., "UL Panel Selection During Initial Access", p. 1-27 and corresponding Fig. 1-11.*

International Search Report and Written Opinion—PCT/US2021/018785—ISA/EPO—Jul. 6, 2021.

Nokia, et al., "On 2-Step RACH Procedure", 3GPP Draft, 3GPP TSG RAN WG1 #97, R1-1906747, on 2-Step RACH Procedure, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728198, 23 Pages.

* cited by examiner

TECHNIQUES FOR COMMUNICATING RANDOM ACCESS MESSAGES BASED ON BEAM REFINING IN WIRELESS COMMUNICATIONS

CLAIM OF PRIORITY UNDER 35 U.S.C. § 119

The present Application for Patent claims priority to Provisional Patent Application No. 62/980,031, entitled "TECHNIQUES FOR COMMUNICATING RANDOM ACCESS MESSAGES BASED ON BEAM REFINING IN WIRELESS COMMUNICATIONS" filed Feb. 21, 2020, which is assigned to the assignee hereof and hereby expressly incorporated by reference herein for all purposes.

FIELD OF TECHNOLOGY

Aspects of the present disclosure relate generally to wireless communication systems, and more particularly, to random access procedures.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and contention resolution information (at least for a contention-based random access procedure). The first message can include two separate transmissions (e.g., in time) of the preamble and payload portions of the message, but may be transmitted before receiving a random access response. In addition, the gap between the preamble transmission and the payload transmission may be configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes selecting, based on whether a base station uses beam refinement in a two-step random access procedure, one or more parameters for transmitting a first random access message in the two-step random access procedure, and transmitting, to the base station and based on the one or more parameters, the first random access message as part of the two-step random access procedure.

In another example, a method for wireless communication is provided. The method includes transmitting a configuration indicating whether beam refinement is used for receiving a first random access message in a two-step random access procedure, and receiving, from a device, a first random access message based on the configuration.

In a further example, an apparatus for wireless communication is provided that includes a transceiver, a memory, and one or more processors coupled with the transceiver and the memory. The memory storing instructions executable by the one or more processors to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided that includes a transceiver, a memory, and one or more processors coupled with the memory and the transceiver. The memory storing instructions executable by the one or more processors to select, based on whether a base station uses beam refinement in a two-step random access procedure, one or more parameters for transmitting a first random access message in the two-step random access procedure, and transmit, to the base station and based on the one or more parameters, the first random access message as part of the two-step random access procedure.

In another example, an apparatus for wireless communication is provided that includes a transceiver, a memory, and one or more processors coupled with the memory and the transceiver. The memory storing instructions executable by the one or more processors to transmit a configuration indicating whether beam refinement is used for receiving a first random access message in a two-step random access procedure, and receive, from a device, the first random access message based on the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
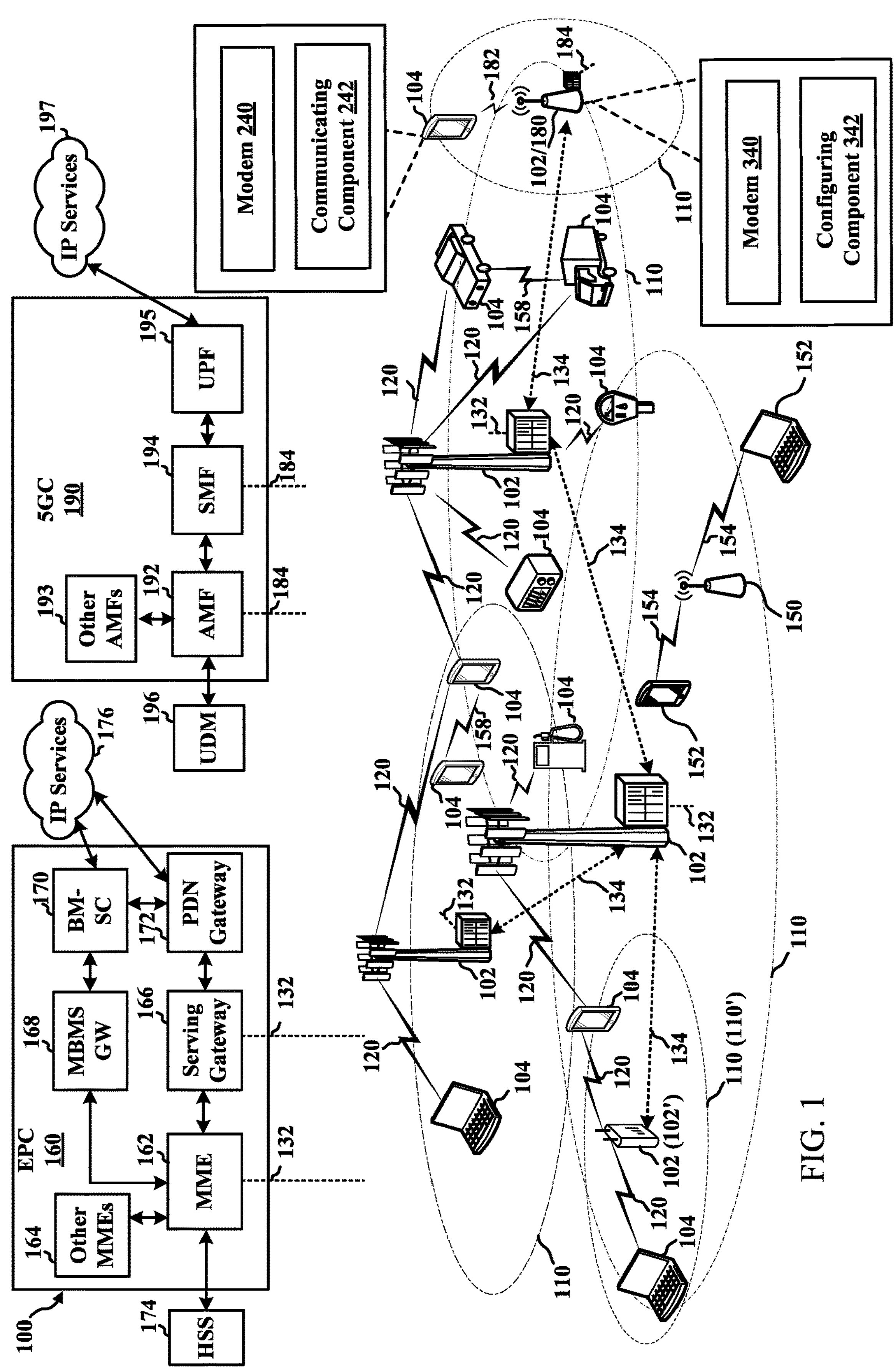
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating messages in a two-step random access procedure, though the concepts may be applied to random access procedures with more or less than two steps as well. In random access procedures, a base station can broadcast signals with parameters for establishing a connection with the base station. Such signals may include a synchronization signal block (SSB), system information blocks (SIBs), reference signals (RSS), and/or the like. A user equipment (UE) can receive the broadcast signals and can synchronize with the downlink from the base station, perform system information decoding and measurement, and/or the like. In addition, the UE can determine, based on parameters in the broadcast signals, one or more random access occasions for transmitting random access messages to establish a connection with the base station. In a two-step random access procedure, when the UE desires to establish a connection with the base station, the UE can transmit a first message (also referred to herein as "msgA"), which may include a preamble portion and a payload portion (e.g., where the payload portion can include physical uplink shared channel (PUSCH) data), and these portions may be transmitted as separated by a transmission gap in time. The base station can receive the first message (e.g., as the preamble and payload portions) and can transmit a response message to the UE (also referred to herein as "msgB"), where the response message can include a random access response. The response message may also include contention resolution information, at least for a contention-based random access procedure.

As described, for example, there can be a transmission gap defined, and used by the UE, between transmission of the preamble portion and the payload portion of the first message. For example, the transmission gap can allow for timing adjustment (TA) for the first message transmission where the TA (e.g., a previous TA for communicating by or with the UE) may be unknown or out of date. Moreover, for example, the transmission gap can allow for different numerology, bandwidth, beam selection, power control scheme, sampling rate for the preamble and payload, compatibility with a listen-before-talk (LBT) scheme (e.g., over a new radio (NR)-U interface), etc. between the preamble portion and the payload portion. In addition, for example, transmission of the preamble portion of the first message can include a guard time between transmissions (e.g., as defined by the wireless communication technology, such as NR, for any time division duplex (TDD) transmission of signals). In this example, the transmission gap may be reduced in view of the added guard time (as compared to not having a guard time). In this regard, in an example, the preamble and payload portions of the first message may be transmitted in different slots (or the same slot) based on the transmission gap and/or the guard time.

In addition, in two-step random access procedures, multiple devices performing the two-step random access procedure may share the same PUSCH occasion (PO) for transmitting the payload portion, for example if their first message transmissions use similar modulation and coding scheme (MCS)/waveform/payload size, etc. Resource allocation for PO can be specified relative to a random access channel (RACH) occasion (RO) for transmitting the first message (or at least the preamble portion thereof), by semi-statically or dynamically configured offsets in time and/or frequency. One or more of separate ROs or shared ROs may possibly be configured for two-step random access procedures. For example, when a RO is shared between two-step random access procedures and four-step random access procedures, the pool of random access preambles that can be used for the random access procedures can be partitioned into mutually exclusive subsets, which are used by different types of random access procedures, in one example.

As described above, msgB in two-step random access procedures is similar to the second message (msg2) and fourth message (msg4) in four-step random access procedures, and thus msgB can perform contention resolution (in a contention-based random access procedure) and completion of RACH procedure if msgA transmission is successful. In addition, for example, msgB can requests retransmission of msgA payload on granted resources if msgA preamble detection is successful but msgA payload decoding fails. In this regard, reception of msgB can be important or critical to the random access procedure.

Aspects described herein relate to using beam refining in communicating one or more portions of the first random access message (e.g., a preamble portion and/or a payload portion). For example, transmission parameters for transmitting a first random access message in a two-step random access procedure can be determined based at least in part on whether beam refining is configured or used by a base station. For example, beam refining, or beam refinement, can refer to a base station sweeping multiple beams in receiving the first random access message, or portion thereof, to determine a desirable beam for communicating with the device. More specifically, for example, beam refining for reception of msgA PUSCH can refer to a mechanism where msgA preamble is received by sweeping multiple narrow beams by the base station, and the best beam among them is used for the reception of msgA PUSCH.

In an example, the base station may inform a device whether it uses beam refining, and the device can use this information to determine transmission parameters for transmitting the first random access message. For example, where beam refining is used by a base station, the device can determine to transmit the first random access message (or a preamble portion or a payload portion thereof) over certain resources or occasions, using repetition (e.g., based on multiple beams) or not, etc. Where the device uses multiple beams to transmit the first random access message (or preamble portion of payload portion thereof), this can improve determination of a favorable beam for the device by the base station where the base station uses beam refining. Where the device does not use multiple beams in this regard, the base station can conserve resources (e.g., by using less resources for random access preamble or payload or not using repetitions) where beam refining is not configured, for example.

The described features will be presented in more detail below with reference to FIGS. 1-7.

As used in this application, the terms "component," "module," "system" and the like are intended to include a computer-related entity, such as but not limited to hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting a first random access message to a base station 102 based at least in part on whether beam refinement is configured at the base station 102, in accordance with aspects described herein. In addition, some nodes may have a modem 340 and configuring component 342 for indicating whether beam refinement is configured at the base station 102, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can initiate a two-step random access procedure with a base station 102 by transmitting a first random access message (msgA) to the base station, to which the base station 102 can respond with a second random access message (msgB). Communicating component 242 can transmit the first random access message based at least in part on whether beam refinement is configured at the base station 102. For example, where beam refinement is configured, communicating component 242 can transmit the first random access message based on a certain mechanism, certain associated resources for transmitting the first random access message, certain mapping of random access occasions to payload occasion, certain random access preambles, with or without repetition, etc., as related to transmitting using beam refinement. In one example, configuring component 342 can indicate to the UE 104 whether beam refinement is configured at the base station 102 (e.g., for receiving the first random access message).

Figure 2:
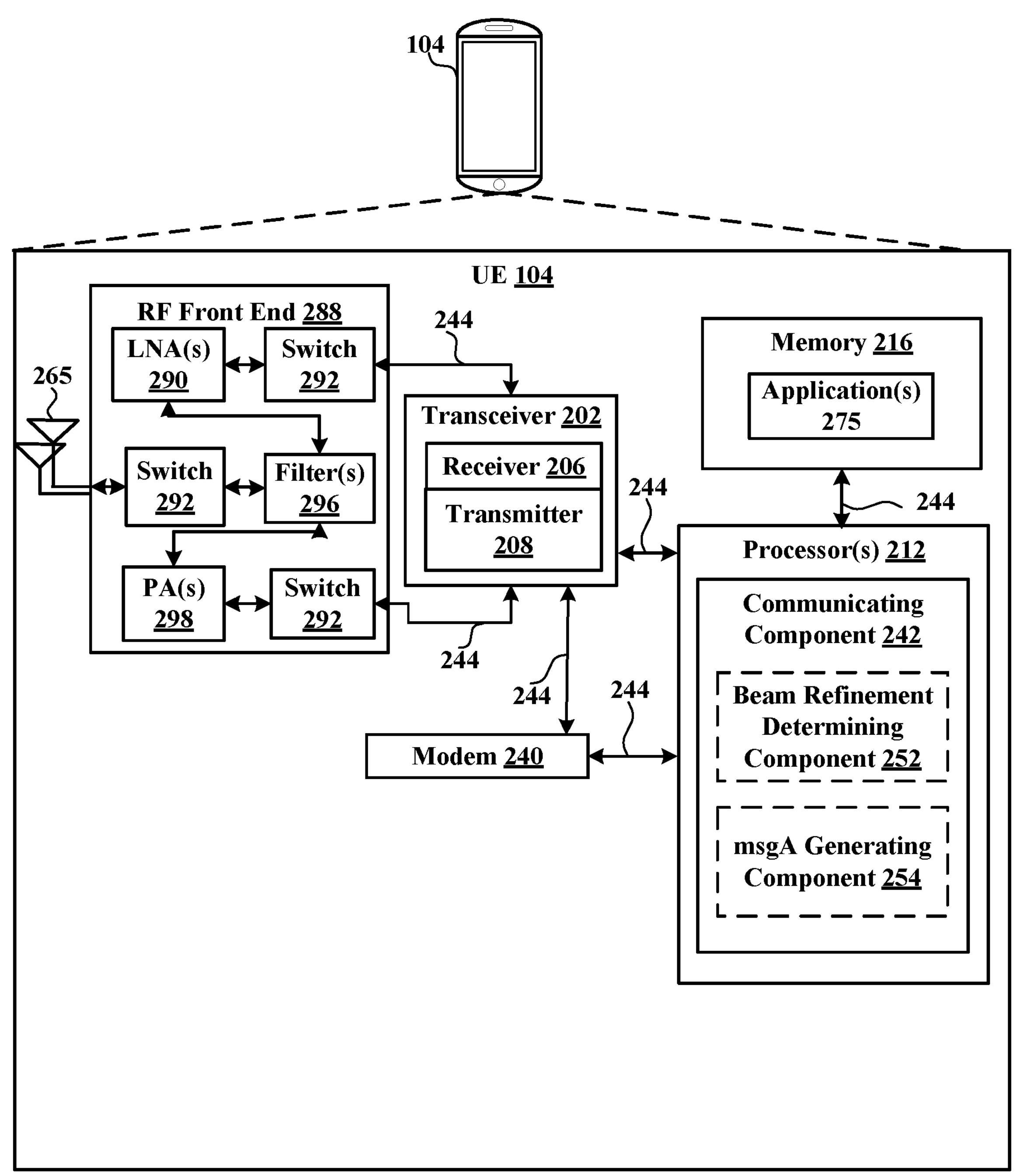
FIG. 2 is a block diagram illustrating an example of a UE, in accordance with various aspects of the present disclosure.
Figure 3:
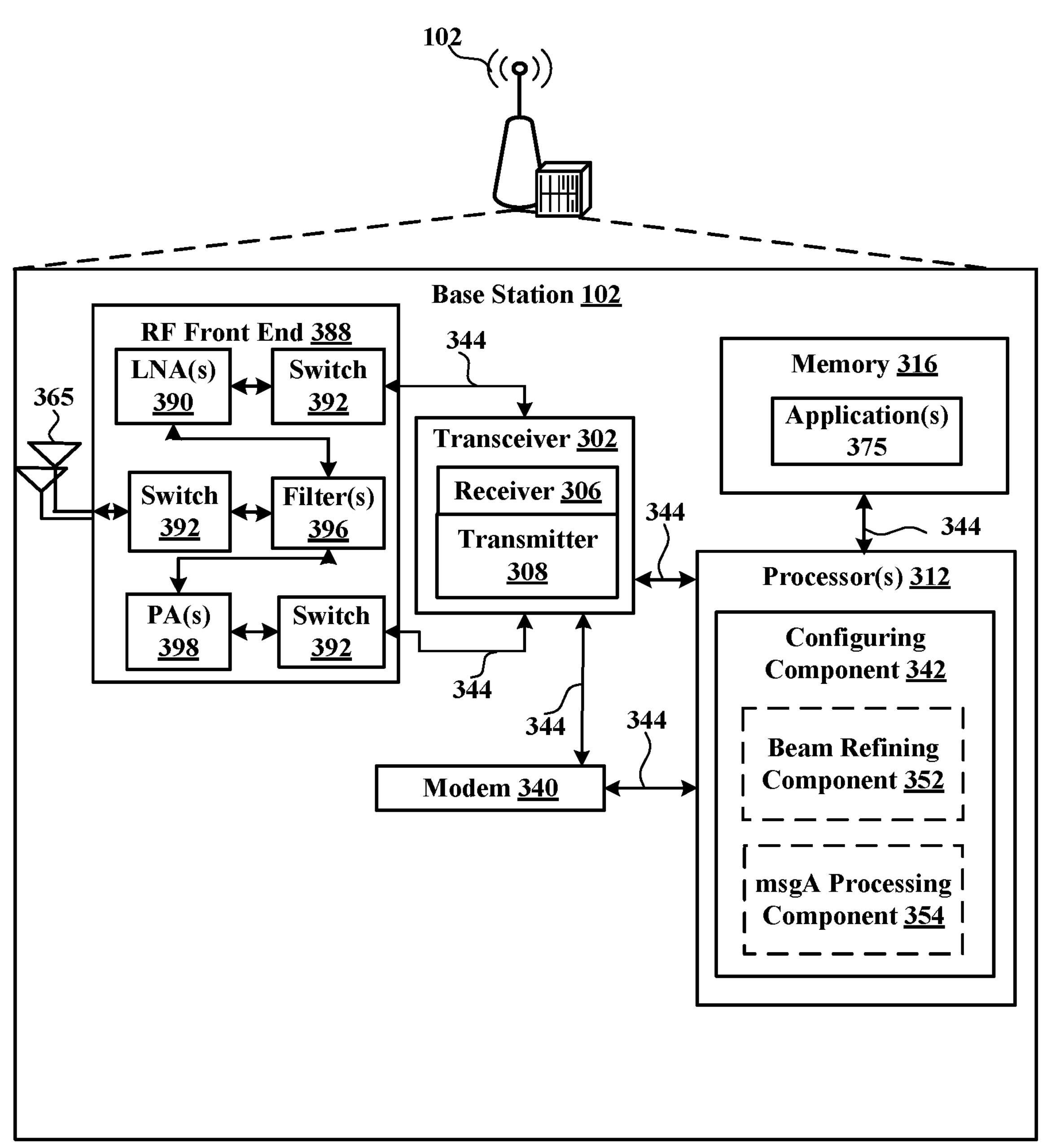
FIG. 3 is a block diagram illustrating an example of a base station, in accordance with various aspects of the present disclosure.
Figure 4:
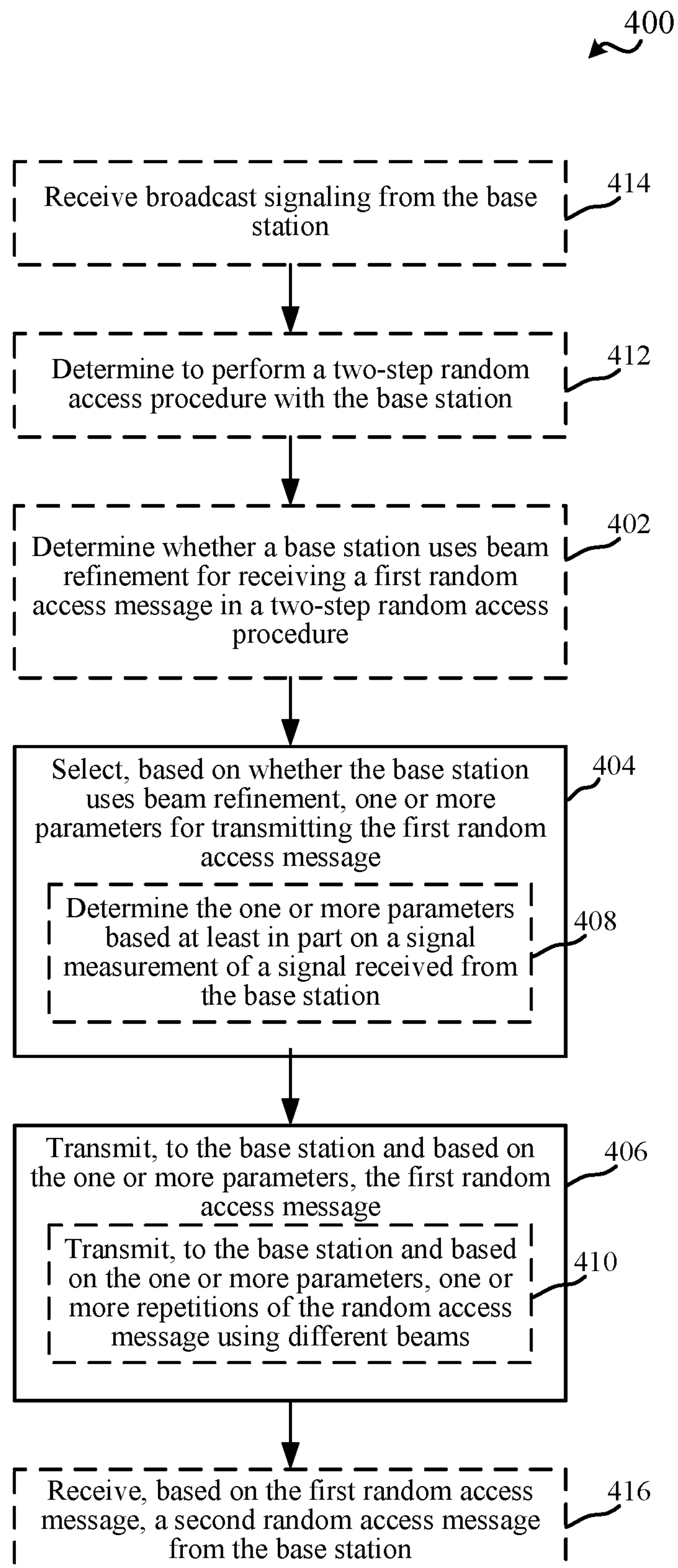
FIG. 4 is a flow chart illustrating an example of a method for transmitting a first random access message, in accordance with various aspects of the present disclosure.
Figure 5:
FIG. 5 is a flow chart illustrating an example of a method for indicating whether beam refinement is configured, in accordance with various aspects of the present disclosure.
Figure 5:
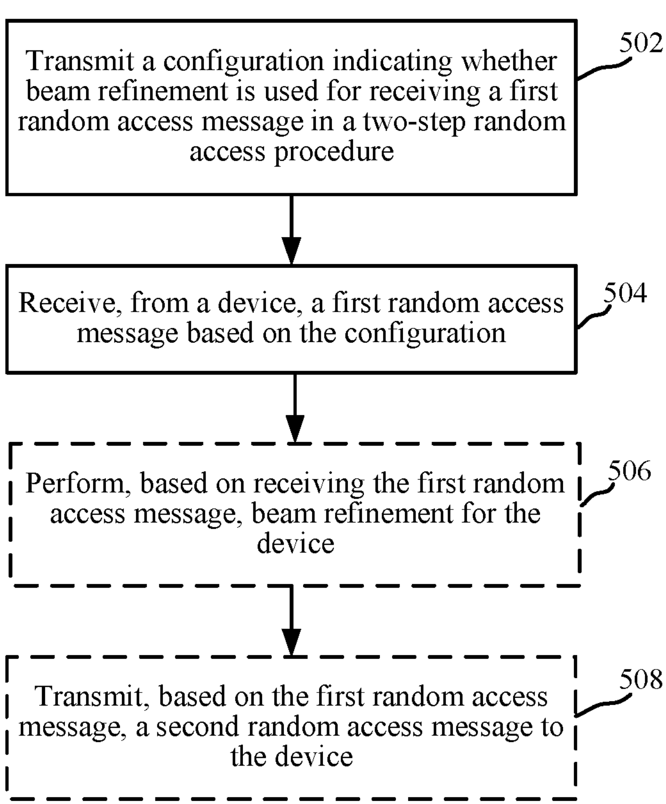

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting a first random access message to a base station 102 based at least in part on whether beam refinement is configured at the base station 102, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAS) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a beam refinement determining component 252 for determining whether beam refinement is configured at a bae station 102, and/or a msgA generating component 254 for generating and transmitting, based on whether beam refinement is configured, a first random access message for a two-step random access procedure, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for indicating whether beam refinement is configured at the base station 102, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a beam refining component 352 for indicating whether beam refining is configured at the base station 102 and/or performing beam refinement to determine a desirable beam for a UE 104, and a msgA processing component 354 for receiving and/or processing the first random access message received from the UE 104, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for transmitting a first random access message in a two-step random access procedure based on whether beam refinement is configured at a base station. In an example, a UE 104 can perform the functions described in method 400 using one or more of the components described in FIGS. 1 and 2.

In method 400, optionally at Block 402, the UE can determine whether a base station uses beam refinement for receiving a first random access message in a two-step random access procedure. In an aspect, beam refinement determining component 252, e.g., in conjunction with processor(s) 212, memory 216, transceiver 202, communicating component 242, etc., can determine whether the base station uses beam refinement for receiving the first random access message in the two-step random access procedure. For example, beam refinement determining component 252 can determine whether the base station uses beam refinement based on receiving a configuration indicating whether the base station 102 uses beam refinement. For example, beam refinement determining component 252 can receive the configuration in remaining minimum system information (RMSI), primary broadcast channel (PBCH) signaling, or other signaling from the base station 102, and the configuration may include an explicit or implicit indicator of whether the base station 102 uses beam refinement in random access procedures. In an example, the configuration may include an explicit one bit flag indicating whether beam refinement is configured for random access procedures or an implicit indicator that may include other data from which existence of beam refinement for random access procedures at the base station 102 can be inferred. For example, an implicit indicator of beam refinement can include an indication of a supported feature, a configured system bandwidth, other parameters configured for the UE 104, etc.

In method 400, at Block 404, the UE can select, based on whether the base station uses beam refinement, one or more parameters for transmitting the first random access message. In an aspect, msgA generating component 254, e.g., in conjunction with processor(s) 212, memory 216, transceiver 202, communicating component 242, etc., can select, based on whether the base station uses beam refinement, the one or more parameters for transmitting the first random access message. For example, where beam refinement is configured at the base station 102 (e.g., where beam refinement determining component 252 determines that the base station 102 uses or supports beam refinement during random access procedures), msgA generating component 254 can use different parameters to generate and/or transmit the first random access message than where beam refinement is not configured at the base station 102. For example, the different parameters may include a process or mechanism for transmitting the first random access message, resources over which to transmit the first random access message (or at least a preamble portion or a payload portion thereof), a mapping of random access occasions for transmitting the preamble portion to payload occasions for transmitting the payload portion, a random access preamble to transmit for the first random access message, whether to transmit the first random access message (or preamble or payload portion thereof) using repetition, etc. In one example, msgA generating component 254 can select or determine the one or more parameters based on determining whether the base station uses beam refinement for receiving the first random access message (e.g., in Block 402).

In a specific example, where beam refinement is configured, msgA generating component 254 can determine to generate and/or transmit the first random access message using a random access preamble selected from a group of random access preambles to use for beam refinement (and using an associated sequence set and/or random access occasion(s) for transmitting the random access preamble). In another example, where beam refinement is configured, msgA generating component 254 can determine to generate and/or transmit the first random access message using repetition. In an example, msgA generating component 254 can determine which transmission parameters correspond to beam refinement based on a configuration received from the base station 102 (e.g., in RMSI). Thus, in one example, base station 102 can transmit, and msgA generating component 254 can receive, a configuration (e.g., transmitted in RMSI) indicating which random access preambles to be used for transmitting the first random access message when beam refinement is configured. In one example, the configuration may also include the one or more parameters for transmitting the first random access message based on beam refinement being configured (or a portion of the one or more parameters).

In method 400, at Block 406, the UE can transmit, to the base station and based on the one or more parameters, the first random access message. In an aspect, communicating component 242, e.g., in conjunction with processor(s) 212, memory 216, transceiver 202, etc., can transmit, to the base station and based on the one or more parameters, the first random access message. For example, as described, communicating component 242 can transmit a preamble portion and/or the payload portion of the first random access message based on the one or more parameters determined at Block 404, where the parameters can be different where beam refinement for random access procedures is configured at the base station 102. In addition, for example, communicating component 242, in this regard, can transmit the first random access message (or preamble or payload portion thereof) based on multiple beams (e.g., by transmitting multiple narrow beams based on the one or more parameters) to allow the base station 102 to sweep the beams and select a desirable beam for the UE 104 in beam refinement. In addition, in an example, the base station 102 can transmit, and communicating component 242 can receive, a second random access message in response to the first random access message, where the second random access message may use a beam selected by the base station 102 as part of beam refinement.

In determining the one or more parameters at Block 404, optionally at Block 408, the UE can determine the one or more parameters based at least in part on a signal measurement of a signal received from the base station. In an aspect, msgA generating component 254, e.g., in conjunction with processor(s) 212, memory 216, transceiver 202, communicating component 242, etc., can determine the one or more parameters further based at least in part on the signal measurement of the signal received from the base station 102. For example, the signal measurement can correspond to a reference signal received power (RSRP), reference signal received quality (RSRQ), received signal strength indicator (RSSI), signal-to-noise ratio (SNR), etc. of the signal received from the base station, where the signal may include a synchronization signal block (SSB) or other signal or reference signal received from the base station 102. For example, the signal measurement can represent quality of the radio environment or channel with the base station 102, and where the signal measurement (e.g., RSRP) does not achieve a threshold, msgA generating component 254 can determine to utilize the one or more parameters, such as applying repetition for a preamble portion of the first random access message to improve the opportunity to receive the preamble portion.

In transmitting the first random access message at Block 406, optionally at Block 410, the UE can transmit, to the base station and based on the one or more parameters, one or more repetitions of the random access message using different beams. In an aspect, communicating component 242, e.g., in conjunction with processor(s) 212, memory 216, transceiver 202, etc., can transmit, to the base station and based on the one or more parameters, the one or more repetitions of the first random access message using the different beams. For example, communicating component 242 can transmit each repetition of the first random access to allow the base station 102 to receive the first random access message using multiple beams, which can allow the base station 102 to perform beam refinement. As described, communicating component 242 can transmit each repetition in different resources, which may include transmitting each repetition in a different time period. The time period during which the repetitions are transmitted may include different symbols (e.g., orthogonal frequency division multiplexing (OFDM) symbols), different slots where each slot includes multiple symbols, etc., which may include adjacent or non-adjacent symbols or slots, etc.

In method 400, optionally at Block 412, the UE can determine to perform a two-step random access procedure with the base station. In an aspect, msgA generating component 254, e.g., in conjunction with processor(s) 212, memory 216, transceiver 202, communicating component 242, etc., can determine to perform the two-step random access procedure with the base station 102. In an example, msgA generating component 254 can determine whether the base station uses beam refinement based on determining to perform the two-step random access procedure. In other examples, however, msgA generating component 254 can determine to perform beam refinement for four-step random access procedures or other types of random access procedures as well.

In method 400, optionally at Block 414, the UE can receive broadcast signaling from the base station. In an aspect, msgA generating component 254, e.g., in conjunction with processor(s) 212, memory 216, transceiver 202, communicating component 242, etc., can receive the broadcast signaling from the base station 102. For example, msgA generating component 254 can receive the broadcast signaling as indicating parameters for performing the two-step random access procedure, which may include an indication of random access preambles to use, preamble occasions or payload occasions for transmitting a preamble portion (or one or more repetitions thereof) or payload portion of the first random access message, etc. In addition, as described for example, the broadcast signaling may include an indication of whether beam refinement is configured at the base station 102 and/or the one or more parameters for transmitting the first random access message using beam refinement, as described above.

In method 400, optionally at Block 416, the UE can receive, based on the first random access message, a second random access message from the base station. In an aspect, communicating component 242, e.g., in conjunction with processor(s) 212, memory 216, transceiver 202, etc., can receive, based on the first random access message, a second random access message from the base station. For example, communicating component 242 can receive the second random access message in response to the first random access message (e.g., in response to the preamble portion (or one or more repetitions thereof) and/or the payload portion). In an example, as described, the base station 102 can transmit the second random access message based on the beam refinement to use a beam desired by the base station 102, which may be based on one of the beams used by the UE 104 to transmit a repetition of the first random access message.

In a specific example, there may be two different methods for msgA PUSCH transmission (and/or different associated resources and/or different mapping of RO to PO) depending on whether the base station uses beam refinement for reception of msgA PUSCH. For example, the base station may inform the UE about the usage of beam refinement (for reception of msgA PUSCH) through RMSI or by a one-bit flag in PBCH. In an example, the presence of msgA beam refinement at the base station (and its indication to UE) may change the mapping of msgA preambles (their corresponding sequence set and/or occasions) to the msgA PUSCH resources and/or transmission properties. UE may transmit msgA PUSCH with or without repetition based on whether the base station has indicated usage of beam refinement (for reception of PUSCH) in RMSI. This procedure may be used selectively by UEs depending on their SSB-based RSRP, as described above in one example. For instance, the UEs may use this procedure when then SSB-based RSRP is corresponding to applying repetition for msgA preamble.

FIG. 5 illustrates a flow chart of an example of a method 500 for indicating whether beam refinement is configured. In an example, a base station 102 can perform the functions described in method 500 using one or more of the components described in FIGS. 1 and 3.

In method 500, at Block 502, the base station can transmit a configuration indicating whether beam refinement is used for receiving a first random access message in a two-step random access procedure. In an aspect, beam refining component 352, e.g., in conjunction with processor(s) 312, memory 316, transceiver 302, configuring component 342, etc., can transmit a configuration indicating whether beam refinement is used for receiving a first random access message in a two-step random access procedure. For example, beam refining component 352 can transmit the configuration using RMSI, PBCH, etc., as described above. In addition, in one example, the configuration, or another configuration transmitted by the base station 102, can indicate one or more parameters for a UE to use in transmitting the first random access message where beam refinement is configured at the base station 102. For example, beam refining component 352 can transmit one or more configurations that indicate random access occasions (e.g., preamble occasions or payload occasions) for transmitting the first random access message (or corresponding portions thereof in a two-step random access procedure) when beam refinement is configured. In another example, beam refining component 352 can transmit one or more configurations that indicate one or more of a random access preamble to use when beam refinement is configured, resources to use for transmitting a preamble portion or payload portion of the first random access message when beam refinement is configured, or other transmission properties to use, etc.

In method 500, at Block 504, the base station can receive, from a device, a first random access message based on the configuration. In an aspect, msgA processing component 354, e.g., in conjunction with processor(s) 312, memory 316, transceiver 302, configuring component 342, etc., can receive, from the device (e.g., from a UE 104), the first random access message based on the configuration. For example, msgA processing component 354 can receive the first random access message from the device based on transmission parameters used when beam refinement is configured, as described. In addition, in an example, msgA processing component 354 may receive (and/or combine) repetitions of the first random access message from the device. In any case, the device can use certain transmission parameters to transmit the first random access message which may allow the beam refining component 352 to perform beam refinement by sweeping multiple narrow beams to determine a beam to use to receive the first random access message.

In an example, receiving based on multiple beams can include msgA processing component 354 receiving the first random access message at multiple times based on different beams (e.g., using a different receive beam for each repetition). The multiple times during which the repetitions are received may include different symbols, different slots, etc., as described above. In an example, msgA processing component 354 can generate each of the multiple receive beams to have a different beamforming direction for receiving the multiple instances of the first random access message. In an example, the base station 102 can configure the multiple beams to use in receiving the first random access message when beam refinement is configured.

In method 500, optionally at Block 506, the base station can perform, based on receiving the first random access message, beam refinement for the device. In an aspect, beam refining component 352, e.g., in conjunction with processor(s) 312, memory 316, transceiver 302, configuring component 342, etc., can perform, based on receiving the first random access message, beam refinement for the device. For example, msgA processing component 354 can receive the first random access message based on multiple beams and based on the one or more parameters described above. Beam refining component 352 can accordingly determine a desirable beam for receiving the first random access message and/or for transmitting a second random access message to the UE 104 in response to the first random access message. For example, beam refining component 354 can determine which of the multiple receive beams results in receiving the first random access message at a highest signal power or quality (e.g., RSRP, RSRQ, RSSI, SNR, etc.).

In method 500, optionally at Block 508, the base station can transmit, based on the first random access message, a second random access message to the device. In an aspect, configuring component 342, e.g., in conjunction with processor(s) 312, memory 316, transceiver 302, etc., can transmit, based on the first random access message, the second random access message to the device to proceed with the random access procedure. In an example, configuring component 342 can transmit the second random access message using a beam determined by beam refining component 352 in performing beam refinement at Block 506. For example, configuring component 342 can use the same beam (or a reciprocal beam) as determined at Block 506 in transmitting the second random access message to the device in response to the first random access message.

Figure 6:
FIG. 6 illustrates an example of a system for transmitting random access messages, in accordance with various aspects of the present disclosure.
Figure 6:
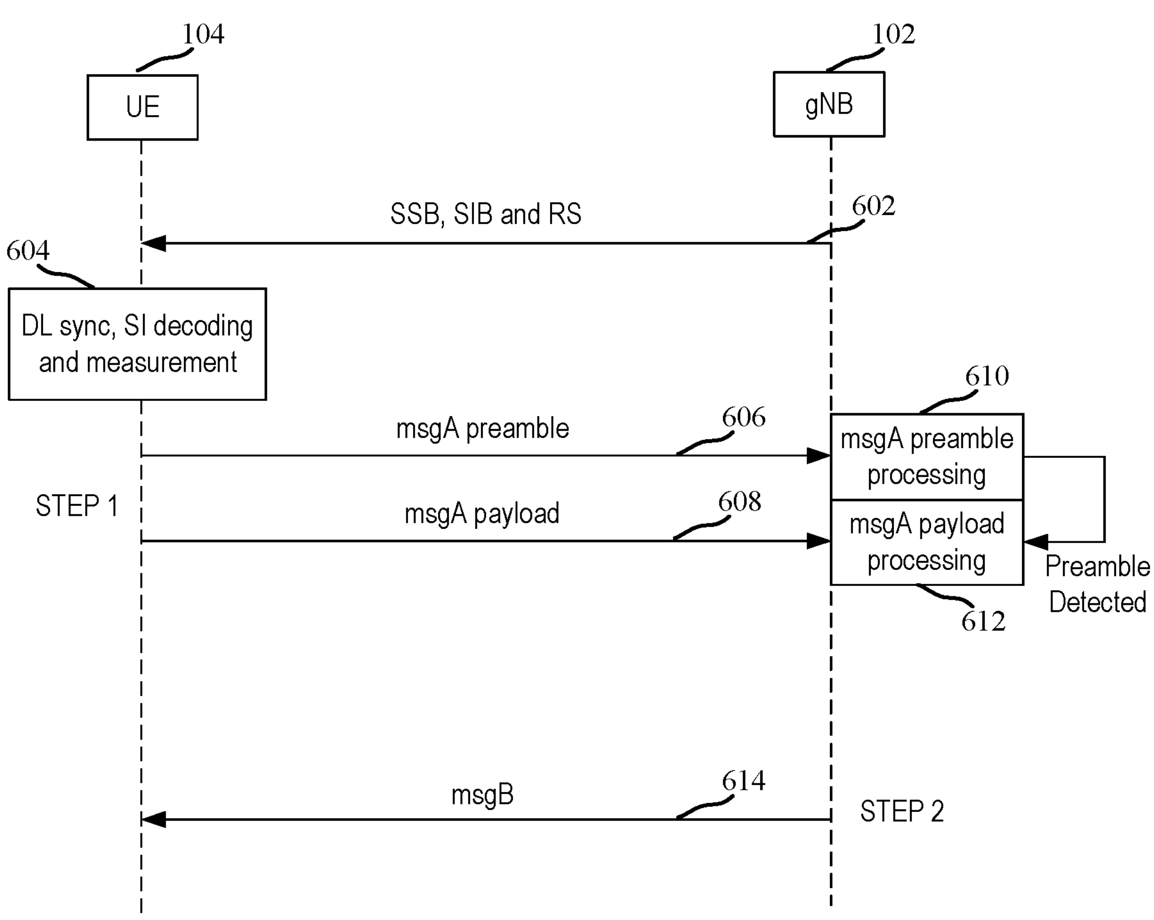

FIG. 6 illustrates an example of a system 600 for transmitting random access messages in a two-step random access procedure. Before starting two-step RACH, UE receives and processes SSB/SIB/RS from the serving gNB. For example, system 600 includes a UE 104 that can transmit random access messages to a gNB 102 for requesting connection establishment therewith. In this example, gNB 102 can transmit SSB, SIB, and RS 602. In one example, the SIB may indicate whether the gNB 102 uses beam refinement or one or more other parameters for performing a random access procedure, as described above. The UE 104 can perform downlink synchronization, system information decoding, and/or measurements at 604. Based on the data in UE's 104 buffer, a UE-identifier and the system information, the UE 104 can generate a message A (msgA), which can be generated based on whether the gNB uses beam refinement, as described herein, and the UE 104 can transmit the msgA to gNB on a RACH occasion (RO) associated with one or more suitable SSB beams. The UE 104 can transmit msgA as a preamble portion 606 and a payload portion 608.

After possibly receiving and processing msgA preamble/payload, gNB 102 can proceed as follows: if both preamble detection and payload decoding are successful at 610 and 612, gNB 102 can generate a message B (msgB) and transmit it to the two-step RACH UE 104 at 614, in which case, msgB can include a contention resolution ID or ACK for msgA payload; if preamble detection is successful at 610 but payload decoding fails at 612, gNB 102 can also generate a msgB and transmit it to the UE 104, in which case, msgB can include a random access preamble index (RAPID) or an ACK for msgA preamble, as well as a DCI for the retransmission of msgA, where the DCI can order both preamble and payload to be re-transmitted, or just request payload to be re-transmitted; or if neither preamble nor payload is detected at 610 and 612, gNB does not transmit msgB 614. In another example, gNB 102 may also perform beam refinement based on the received msgA, as described herein.

Figure 7:
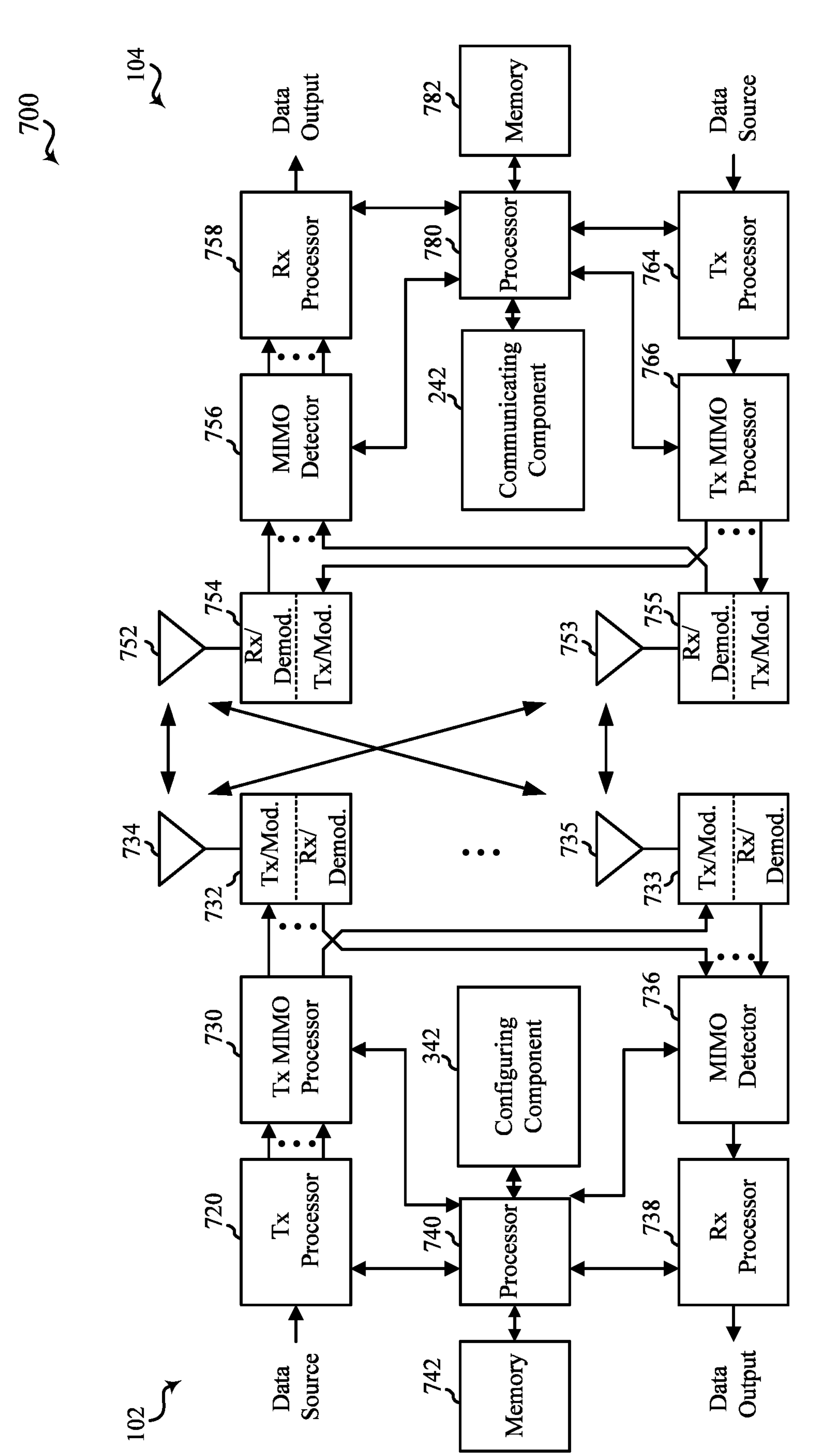
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including selecting, based on whether a base station uses beam refinement in a two-step random access procedure, one or more parameters for transmitting a first random access message in the two-step random access procedure, and transmitting, to the base station and based on the one or more parameters, the first random access message as part of the two-step random access procedure.

In Aspect 2, the method of Aspect 1 includes wherein selecting the one or more parameters comprises selecting, based on whether the base station uses beam refinement, resources over which to transmit the first random access message.

In Aspect 3, the method of any of Aspects 1 or 2 includes wherein selecting the one or more parameters comprises selecting, based on whether the base station uses beam refinement, a mapping of random access occasion to payload occasion for transmitting the first random access message.

In Aspect 4, the method of any of Aspects 1 to 3 includes wherein selecting the one or more parameters comprises selecting, based on whether the base station uses beam refinement, a random access preamble to use in transmitting the first random access message.

In Aspect 5, the method of any of Aspects 1 to 4 includes wherein selecting the one or more parameters comprises selecting, based on whether the base station uses beam refinement, payload resources for transmitting the first random access message.

In Aspect 6, the method of any of Aspects 1 to 5 includes wherein selecting the one or more parameters comprises selecting, based on whether the base station uses beam refinement, transmission properties for transmitting the first random access message.

In Aspect 7, the method of any of Aspects 1 to 6 includes receiving, from the base station a configuration indicating whether the base station uses beam refinement.

In Aspect 8, the method of Aspect 7 includes wherein receiving the configuration comprises receiving the configuration in remaining minimum system information or primary broadcast channel transmitted by the base station.

In Aspect 9, the method of any of Aspects 1 to 8 includes wherein transmitting the first random access message comprises transmitting, based on whether the base station uses beam refinement, one or more repetitions of the first random access message.

In Aspect 10, the method of Aspect 9 includes determining to transmit the one or more repetitions of the first random access message based at least in part on a received signal power of a synchronization signal block (SSB) received from the base station.

Aspect 11 is a method for wireless communication including transmitting a configuration indicating whether beam refinement is used for receiving a first random access message in a two-step random access procedure, and receiving, from a device, the first random access message based on the configuration.

In Aspect 12, the method of Aspect 11 includes wherein the configuration indicates one or more parameters for transmitting the first random access message when beam refinement is configured.

In Aspect 13, the method of Aspect 12 includes wherein the one or more parameters indicate a mapping of random access occasion to payload occasion for transmitting the first random access message.

In Aspect 14, the method of Aspect 12 includes wherein the one or more parameters indicate a random access preamble to use in transmitting the first random access message.

Aspect 15 is a method for wireless communication includes selecting, based on whether a base station uses beam refinement in a two-step random access procedure, one or more parameters for transmitting a first random access message in the two-step random access procedure, and transmitting, to the base station and based on the one or more parameters, the first random access message as part of the two-step random access procedure.

In Aspect 16, the method of Aspect 15 includes wherein selecting the one or more parameters comprises selecting, based on whether the base station uses beam refinement, resources over which to transmit the first random access message.

In Aspect 17, the method of any of Aspects 15 or 16 includes wherein selecting the one or more parameters comprises selecting, based on whether the base station uses beam refinement, a mapping of random access occasion to payload occasion for transmitting the first random access message.

In Aspect 18, the method of any of Aspects 15 to 17 includes wherein selecting the one or more parameters comprises selecting, based on whether the base station uses beam refinement, a random access preamble to use in transmitting the first random access message.

In Aspect 19, the method of any of Aspects 15 to 18 includes wherein selecting the one or more parameters comprises selecting, based on whether the base station uses beam refinement, payload resources for transmitting the first random access message.

In Aspect 20, the method of any of Aspects 15 to 19 includes wherein selecting the one or more parameters comprises selecting, based on whether the base station uses beam refinement, transmission properties for transmitting the first random access message.

In Aspect 21, the method of any of Aspects 15 to 20 includes receiving, from the base station, a configuration indicating whether the base station uses beam refinement.

In Aspect 22, the method of Aspect 21 includes wherein receiving the configuration comprises receiving the configuration in remaining minimum system information or primary broadcast channel transmitted by the base station.

In Aspect 23, the method of any of Aspects 15 to 22 includes wherein transmitting the first random access message comprises transmitting, based on whether the base station uses beam refinement, one or more repetitions of the first random access message.

In Aspect 24, the method of Aspect 23 includes determining to transmit the one or more repetitions of the first random access message based at least in part on a received signal power of a synchronization signal block (SSB) received from the base station.

Aspect 25 is an apparatus for wireless communication including a transceiver, a memory, and one or more processors coupled with the memory and the transceiver, the memory storing instructions executable by the one or more processors to perform one or more of the methods of any of Aspects 1 to 24.

Aspect 26 is an apparatus for wireless communication including means for performing one or more of the methods of any of Aspects 1 to 24.

Aspect 27 is a computer-readable medium including code executable by one or more processors for wireless communications, the code including code for performing one or more of the methods of any of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:

a transceiver;

a memory; and one or more processors coupled with the memory and the transceiver, the memory storing instructions executable by the one or more processors to cause the apparatus to:

receive, from a network node, a configuration indicating whether the network node uses beam refinement in a two-step random access procedure to receive, from a user equipment, multiple repetitions of a first random access message using a different receive beam for each of the multiple repetitions;

select, based on the configuration indicating that the network node uses the beam refinement, one or more parameters for transmitting a repetition of at least a portion of the first random access message in the two-step random access procedure, wherein the first random access message is a MsgA in the two-step random access procedure, wherein the one or more processors are configured to select the one or more parameters at least in part by changing, based on the configuration indicating that the network node uses the beam refinement, a mapping between a random access preamble of the first random access message and frequency or time resources for transmitting a payload of the first random access message;

transmit, to the network node and based on the one or more parameters, the repetition of at least the portion of the first random access message as part of the two-step random access procedure; and transmit, based on whether the network node uses beam refinement and based on a received signal power of a synchronization signal block (SSB) received from the network node being less than a threshold, one or more additional repetitions of at least the portion of the first random access message.

2. The apparatus of claim 1, wherein the memory further stores instructions executable by the one or more processors to select the one or more parameters, based on whether the network node uses beam refinement, to include resources over which to transmit the repetition of at least the portion of the first random access message.

3. The apparatus of claim 1, wherein the memory further stores instructions executable by the one or more processors to cause the apparatus to select the one or more parameters, based on whether the network node uses beam refinement, to include a mapping of random access occasion to payload occasion for transmitting the repetition of at least the portion of the first random access message.

4. The apparatus of claim 1, wherein the memory further stores instructions executable by the one or more processors to cause the apparatus to select the one or more parameters, based on whether the network node uses beam refinement, to include a random access preamble to use in transmitting the repetition of at least the portion of the first random access message.

5. The apparatus of claim 1, wherein the memory further stores instructions executable by the one or more processors to cause the apparatus to select the one or more parameters, based on whether the network node uses beam refinement, to include payload resources for transmitting the repetition of at least the portion of the first random access message.

6. The apparatus of claim 1, wherein the memory further stores instructions executable by the one or more processors to cause the apparatus to select the one or more parameters, based on whether the network node uses beam refinement, to include transmission properties for transmitting the repetition of at least the portion of the first random access message.

7. The apparatus of claim 1, wherein the memory further stores instructions executable by the one or more processors to cause the apparatus to receive the configuration in remaining minimum system information or primary broadcast channel transmitted by the network node.

8. A method for wireless communication, comprising:

receiving, from a network node, a configuration indicating whether the network node uses beam refinement in a two-step random access procedure to receive, from a user equipment, multiple repetitions of a first random access message using a different receive beam for each of the multiple repetitions;

selecting, based on the configuration indicating that the network node uses the beam refinement, one or more parameters for transmitting a repetition of at least a portion of the first random access message in the two-step random access procedure, wherein the first random access message is a MsgA in the two-step random access procedure, wherein selecting the one or more parameters includes changing, based on the configuration indicating that the network node uses the beam refinement, a mapping between a random access preamble of the first random access message and frequency or time resources for transmitting a payload of the first random access message;

transmitting, to the network node and based on the one or more parameters, the repetition of at least the portion of the first random access message as part of the two-step random access procedure; and transmitting, based on whether the network node uses beam refinement and based on a received signal power of a synchronization signal block (SSB) received from the network node being less than a threshold, one or more additional repetitions of at least the portion of the first random access message.

9. The method of claim 8, wherein selecting the one or more parameters comprises selecting, based on whether the network node uses beam refinement, resources over which to transmit the repetition of at least the portion of the first random access message.

10. The method of claim 8, wherein selecting the one or more parameters comprises selecting, based on whether the network node uses beam refinement, a mapping of random access occasion to payload occasion for transmitting the repetition of at least the portion of the first random access message.

11. The method of claim 8, wherein selecting the one or more parameters comprises selecting, based on whether the network node uses beam refinement, a random access preamble to use in transmitting the repetition of at least the portion of the first random access message.

12. The method of claim 8, wherein selecting the one or more parameters comprises selecting, based on whether the network node uses beam refinement, payload resources for transmitting the repetition of at least the portion of the first random access message.

13. The method of claim 8, wherein selecting the one or more parameters comprises selecting, based on whether the network node uses beam refinement, transmission properties for transmitting the repetition of at least the portion of the first random access message.

14. The method of claim 8, wherein receiving the configuration comprises receiving the configuration in remaining minimum system information or primary broadcast channel transmitted by the network node.

* * * * *